P. B. SAMPLE.
LUBRICATOR.
APPLICATION FILED JUNE 6, 1919.
1,333,451.
Patented Mar. 9, 1920.
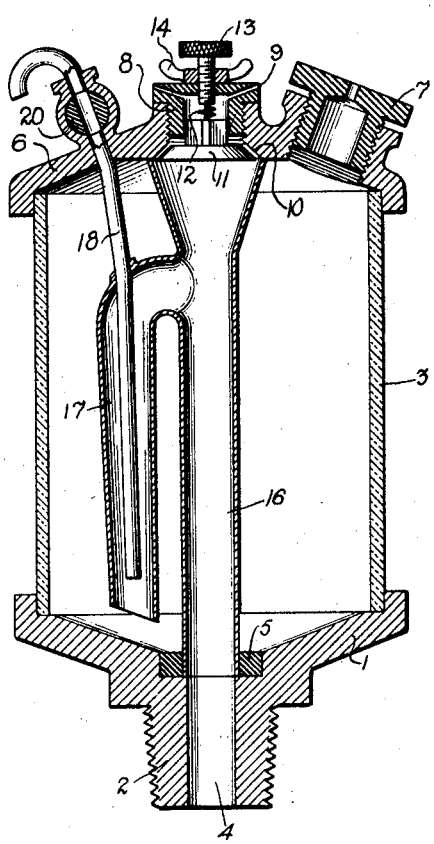
WITNESSES
INVENTOR
P.B. SAMPLE
BY
ATTORNEYS

UNITED STATES PATENT OFFICE.

PERRY B. SAMPLE, OF BROOKLYN, NEW YORK.

LUBRICATOR.

1,333,451.   Specification of Letters Patent.   Patented Mar. 9, 1920.

Application filed June 6, 1919. Serial No. 302,223.

*To all whom it may concern:*

Be it known that I, PERRY B. SAMPLE, a citizen of the United States, and a resident of the city of New York, borough of Brooklyn, county of Kings, and State of New York, have invented a new and Improved Lubricator, of which the following is a full, clear, and exact description.

This invention relates to oilers, lubricators, and the like. More particularly the invention relates to a lubricator specially designed to inject graphite, powdered soap stone, talcum or other similar lubricating substances to manifolds, crank case, and cylinders of internal combustion motors.

An object of the invention is to disclose the design of a lubricator for use in connection with engines, and particularly gas engines, which will effectively handle dry lubricants, and which may be adjusted to feed said lubricants in regulated quantities to the engine parts to be lubricated.

Another object is to provide a means of regulating the quantity of lubricant into the engine parts, and also means are employed for regulating the rate of flow of lubricant.

It is a further object to provide a lubricator which will be comparatively simple in construction and operation, not expensive to build, and which will comprise a minimum number of working parts.

With the above and other objects in view, the invention has relation to a certain combination and arrangement of parts, an example of which is identified in the following description, designated in the appended claims, and portrayed in the accompanying drawings which show a longitudinal sectional view of the lubricator.

Referring now more in particular to the drawings, the numeral 1 points out a base upon which the lubricator parts are mounted. A threaded boss 2 is made on the base 1, and the base is provided with a shoulder formed on the rim. A cylindrical casing 3 is mounted on the base and used to hold the lubricant which is to be fed to the engine. The base is bored out at 4, and a ring plug 5 fitted into the base at the upper end of the bore.

A cover cap 6 is fitted on the top end of the casing and forms an inclosed lubricator cup. This cap is provided with a filler plug 7 through which the lubricator is filled. The plug will have an air inlet or vent to insure equalization of air pressure.

A threaded plug 8 is screwed into a hole formed in the cap 6. This plug is provided with air inlets 9. A valve seat 10 is formed on the inner side of the cap 6 by counterboring the hole which mounts the plug 8. A valve 11 is mounted to close, or approximately close against the valve seat. The valve depends from a soft and yieldable spring 12 which is attached to an adjusting screw 13. The adjusting screw is threaded into the plug 8 and is fitted with a lock nut 14 employed to hold the adjusting screw in fixed position.

A lubricant feed pipe 16 is disposed longitudinally within the lubricator cup with the lower open end inserted in the ring plug 5 to form a close fitting joint and to connect with the bore 4. The upper end of the feed pipe may be flared out to encompass the valve and valve seat. The upper end of the tube will closely fit the surface of the cap to form an air-tight joint. The feed pipe joins with a downwardly directed tubular extension 17 which is open at the bottom and which terminates just above the surface of the base. Thus the open lower end of the tubular extension is spaced from the surface of the base.

An injector tube is employed to pass air under atmospheric pressure into the lubricator cup for picking up the dry or flake lubricant. This consists of the tube 18 inserted in the tubular extension 17 and open at the lower end. The lower open end is slightly spaced above the open end of the tubular member 17. A valve 20 is provided on the cap, and the injector tube connects with this valve. The valve may be closed or opened to control the air flow or injection to the tubular extension and feed pipe.

The lubricator is attached to an engine by screwing the threaded boss into a tapped hole made in the intake manifold, crank case, or other engine parts. It is often desirable to pass small and regulated quantities of dry lubricant such as graphite to the cylinder walls or other parts. This may be effected by utilizing the suction or intake stroke of the motor to carry in particles of lubricant. The lubricator casing or cap is filled and proper regulation of the valves effected. The lubricant will bank up around the lower open tube 17 and close the tube by partly working up into it.

The suction stroke of the engine will induce a vacuum through the feed pipe, tubular extension and the air injector tube. The dry and flake lubricant is banked within the open mouth of the tube 17 directly beneath the open end of the air injector tube. On each suction impulse of the engine, the air injector tube will project a stream of air downwardly against the banked lubricant. This causes the lubricant particles to flutter and become suspended in the air within the tubular extension. The particles in suspension are rapidly drawn upwardly through the tube 17 and downwardly through the feed pipe and passed from the lubricator to the engine.

The valve 20 will be finely adjusted to regulate the quantity of air taken in to break up and lift the lubricant particles into suspension. The more air admitted through this valve the larger the quantity of lubricant to be fed to the engine, thus the quantity of feed is regulated by the valve 20.

The valve 11 may be adjusted to admit more or less air through the valve 11—12 during the operation of the engine to be lubricated. By adjusting the valve nearly closed, a very small amount of air flows through the passages 9 into the feed pipe. In this way the downward rate of movement of air in the feed pipe is regulated to flow very slow in velocity. If the valve is open full, maximum rate of air flow or velocity is attained. Thus the rate of flow of lubricant is effected through proper adjustment of this valve 11.

This type of lubricator may be used to good effect where dry lubricant is in use. Its regulating means provide adequate control of amount of lubricant to be issued to the bearings, and the speed or rate at which it will be issued.

Having thus described my invention, what I claim as new, and desire to secure by Letters Patent is:

1. A lubricator device for feeding lubricants to bearings comprising; a lubricator capable of holding lubricant, a feed pipe disposed therein with the upper and lower ends thereof forming an air-tight joint with said lubricator, an air regulating valve employed to regulate the rate of air flow into the feed pipe, a tubular extension connected with the feed pipe and having an open end spaced from the wall of the lubricator, an air valve provided on the lubricator, an air injector tube disposed within the tubular extension with the open end of said tube spaced from the open end of the tubular extension and the other end of said injector tube connecting with the last named valve for regulating the quantity of air injected into the tubular extension.

2. Lubricator for feeding dry lubricant comprising: a lubricant container, a feed pipe disposed centrally therein, a tubular extension connected with the feed pipe and downwardly directed with the lower end thereof open, an air injector tube connected with the tubular extension with the lower end of the air injector tube terminating adjacent the lower end of the tubular extension, a valve to regulate the flow of air into the injector tube, and a valve employed to regulate the flow of air into the feed tube.

3. A lubricator for feeding dry lubricants, embodying a base and cap with a container casing disposed therebetween, a feed tube anchored to the base and the cap, an air regulating valve mounted in the cap to admit air into the feed tube, a tubular extension connected with the feed tube and extending downwardly where it opens adjacent the base, and an air injector valve disposed in the tubular extension and opening approximately adjacent the lower end thereof to agitate the dry lubricant directly under the tubular extension.

PERRY B. SAMPLE.